US006855451B2

(12) United States Patent
Ghosh et al.

(10) Patent No.: US 6,855,451 B2
(45) Date of Patent: Feb. 15, 2005

(54) ELECTROCHEMICAL CELL INTERCONNECT

(75) Inventors: Debabrata Ghosh, Calgary (CA); Michael Pastula, Calgary (CA); Dennis Prediger, Calgary (CA); Martin Perry, Calgary (CA); Arpad Horvath, Calgary (CA); Jim Lumsden, Calgary (CA)

(73) Assignee: FuelCell Energy, Ltd., Calgary (CA)

( * ) Notice: Subject to any disclaimer, the term of this patent is extended or adjusted under 35 U.S.C. 154(b) by 478 days.

(21) Appl. No.: 09/682,817

(22) Filed: Oct. 22, 2001

(65) Prior Publication Data

US 2002/0055028 A1 May 9, 2002

Related U.S. Application Data

(60) Provisional application No. 60/246,546, filed on Nov. 8, 2000.

(51) Int. Cl.[7] .............................. H01M 8/12; H01M 8/02
(52) U.S. Cl. .............................. 429/39; 429/30; 429/34; 429/35
(58) Field of Search ................................ 429/30, 34–39

(56) References Cited

U.S. PATENT DOCUMENTS

| | | |
|---|---|---|
| 3,468,712 A | 9/1969 | Gillespie |
| 3,484,298 A | 12/1969 | Nichols |
| 3,530,005 A | 9/1970 | Leondard |
| 4,597,170 A | 7/1986 | Isenberg |
| 4,767,518 A | 8/1988 | Maskalick |
| 5,035,962 A | 7/1991 | Jensen |
| 5,037,525 A | 8/1991 | Badwal |
| 5,300,370 A | 4/1994 | Washington et al. |
| 5,316,644 A | 5/1994 | Titterington et al. |
| 5,385,792 A | 1/1995 | Shiratori et al. |
| 5,527,363 A | 6/1996 | Wilkinson et al. |
| 5,629,103 A | 5/1997 | Wersing et al. |
| 5,676,806 A | 10/1997 | Van Berkel et al. |
| 5,683,828 A | 11/1997 | Spear et al. |
| 5,770,327 A | 6/1998 | Barnett et al. |
| 5,776,624 A | 7/1998 | Neutzler |
| 5,858,567 A | 1/1999 | Spear, Jr. et al. |
| 5,858,569 A | 1/1999 | Meacher et al. |
| 5,863,671 A | 1/1999 | Spear, Jr. et al. |
| 2002/0024185 A1 * | 2/2002 | Ghosh et al. ............... 277/650 |

FOREIGN PATENT DOCUMENTS

| | | |
|---|---|---|
| EP | 1 220 347 A2 | 12/2001 |
| WO | PCT/NL96/00180 | 4/1996 |
| WO | PCT/US97/22507 | 11/1997 |
| WO | WO 02/17416 A2 | 8/2001 |

* cited by examiner

Primary Examiner—Susy Tsang-Foster
(74) Attorney, Agent, or Firm—Bennett Jones LLP

(57) ABSTRACT

A solid oxide fuel cell stack incorporates metallic interconnects each of which includes a fuel intake manifold, a fuel exhaust manifold, an oxidant intake manifold and an oxidant exhaust manifold. The fuel side of the interconnect defines a fuel flow field surrounded by a continuous sealing surface and in fluid communication with the fuel intake and exhaust manifold. The oxidant side of the interconnect defines an oxidant flow field surrounded by a continuous sealing surface and in fluid communication with the oxidant intake and exhaust manifolds. The interconnect may be fabricated by brazing together three stainless steel plates having overlapping openings to permit the exclusionary flow of fuel and oxidant through the interconnect.

10 Claims, 5 Drawing Sheets

ELECTROCHEMICAL CELL INTERCONNECT

BACKGROUND OF INVENTION

The present invention relates to a solid electrolyte fuel cell configuration comprising metallic interconnect elements to act as fuel and oxidant manifolds and distribution channels.

In a fuel cell, oxidant and fuel are electrochemically reacted without burning to produce electricity directly. The reactants are supplied to the cell through manifolds and flow fields that direct reactants to the appropriate sides of a solid ceramic membrane, that membrane that acts as an electrolyte. The membrane is coated with electrodes on both sides, and is impervious to the transfer of electrons, but not ions of the oxidant. Thus the streams of reactants are kept separate, but the electrons and ions from the reactants are allowed contact to effect the reaction. During operation electrons are emitted at the fuel side electrode of the solid electrolyte membrane whereas electrons are absorbed at the oxygen side electrode thereby generating a potential difference between the two electrodes. The solid electrolyte membrane separates the reactants; it transfers the charge in the form of ions and, at the same time, prevents an electron short circuit between the two electrodes of the solid electrolyte. For this purpose, the solid electrolyte membrane needs to have a low conductivity for electrons but at the same time, a high conductivity for ions through the vertical cross section of the membrane.

Solid oxide fuel cells typically operate at high temperature, often in excess of 600° C. This limits the selection of materials available for use as an interconnect that are able to withstand this temperature, and to simultaneously withstand an oxidizing environment on one side of the interconnect, and a partial reducing environment on the other. The material is also required to simultaneously maintain good electrical conductivity to collect the current generated by the cells. Most prior art interconnects have used ceramic materials and composites, however these materials demonstrate inferior electrical conductivity as compared to metals, and typically are not successful in withstanding both oxidizing and reducing environments simultaneously.

Ceramic materials also are expensive to purchase as raw materials, require moulding or other processing, and then firing or sintering. These steps are all labour intensive and require significant amounts of time to process. In addition, fine tolerances that are required in a solid oxide fuel cell stack are difficult to maintain when a green ceramic is sintered at the high temperatures required. Further, ceramic materials are brittle, and there can be significant losses during production due to handling and processing damage that occurs in the manufacture of the interconnect. Ceramic materials are also vibration and shock intolerant, which makes them unsuitable for applications where these factors are present, such as in automobiles.

Metallic interconnects which are machined from solid metal plates are known but are difficult to manufacture and as a result are expensive. There have been attempts to form metallic interconnects by bonding stacked metal plates together however such attempts have not been successful because of leaks forming between the metal plates and their inability to withstand the operating temperatures of solid oxide fuel cells. For example, U.S. Pat. No. 3,484,298 discloses a laminated electrode backing plate which is laminated using adhesives or other bonding agents.

Accordingly, it is a object of the present invention to disclose a metallic interconnect that can overcome the disadvantages of the prior art, and can be produced at a lower cost with finer more consistent tolerances, while being more robust and substantially leak-free.

SUMMARY OF INVENTION

The present invention includes an interconnect plate having improved construction and design which simplifies the manufacturing of the plate and provides greater dimensional accuracy at a lower cost that the existing art. The invention is also directed at a method of manufacturing the improved interconnect plate.

Accordingly, in one aspect, the invention comprises an interconnect plate comprising a fuel intake manifold, a fuel exhaust manifold, an oxidant intake manifold, and an oxidant exhaust manifold, said interconnect plate comprising a lamination of three layers, wherein: (a) a first layer comprises a fuel plate defining a fuel flow field; (b) a second layer comprises an oxidant gas plate defining a oxidant gas field; and (c) a third layer comprises an barrier plate disposed between the fuel plate and the oxidant gas plate, said barrier plate comprising a central barrier portion separating the fuel flow field and the oxidant gas field and defining i. a fuel intake opening providing fluid communication between the fuel intake manifold and the fuel flow field, ii. a fuel exhaust opening providing fluid communication between the fuel flow field and the fuel exhaust manifold, iii. an oxidant gas intake opening providing fluid communication between the oxidant intake manifold and the oxidant gas field, iv. an oxidant gas exhaust opening providing fluid communication between the oxidant gas field and the oxidant exhaust manifold;

(d) and wherein the fuel flow field, oxidant gas field and central barrier portion are centrally positioned in the interconnect and the fuel intake manifold, fuel exhaust manifold, oxidant intake manifold and oxidant exhaust manifold are peripherally positioned in the interconnect.

In another aspect, the invention may comprise a solid oxide fuel cell stack comprising at least two interconnect plates as described herein, a solid oxide fuel cell unit, a manifold seal continuously encircling each manifold, and a cell seal continuously encircling the fuel cell unit, wherein the fuel cell unit, manifold seals and cell seal are disposed between the two interconnect plates.

In yet another aspect, the invention may comprise an planar interconnect plate having two major surfaces and four minor surfaces, and defining a fuel intake manifold, a fuel exhaust manifold, an oxidant intake manifold, and an oxidant exhaust manifold, wherein the four minor surfaces are each within a manifold, said interconnect plate comprising: (a) a fuel side surface having a first continuous sealing surface and defining an open fuel flow field isolated by the first sealing surface; (b)an oxidant side having a second continuous sealing surface and defining an open oxidant flow field isolated by the second sealing surface; (c) a first port defined by a first minor surface and within the interconnect between the first and second sealing surfaces, which provides fluid communication between the fuel intake manifold and the fuel flow field; (d) a second port defined by a second minor surface and within the interconnect between the first and second sealing surfaces, which provides fluid communication between the fuel flow field and the fuel exhaust manifold; (e) a third port defined by a third minor surface and within the interconnect between the first and second sealing surfaces which provides fluid communication between the oxidant intake manifold and the oxidant flow field; (f) a fourth port defined by a fourth major surface and within the interconnect between the first and second sealing surfaces which provides fluid communication between the oxidant flow field and the oxidant exhaust manifold; and wherein the fuel flow path comprising the first and second ports and the fuel flow field does not join the oxidant flow path comprising the third and fourth ports and the oxidant flow field.

A solid oxide fuel cell stack interconnect of the present invention may be substantially all metal in construction, and in one embodiment, the plates are made of relatively inexpensive stainless steel, rather than the more exotic alloys, and are manufactured by any suitable process that can maintain dimensional accuracy, such as laser cutting, stamping, die cutting or water jet cutting.

In another aspect, the invention may comprise a method of making an interconnect plate as described herein, comprising the step of furnace brazing the fuel side plate, barrier plate and oxidant gas plate together using a braze compound comprising nickel, chromium and boron.

The interconnect may be suitable for the use of compressible gas seals between the various components where necessary to ensure the gas integrity of the two gas streams flowing through the fuel cell stack.

DETAILED DESCRIPTION

Figure 1:
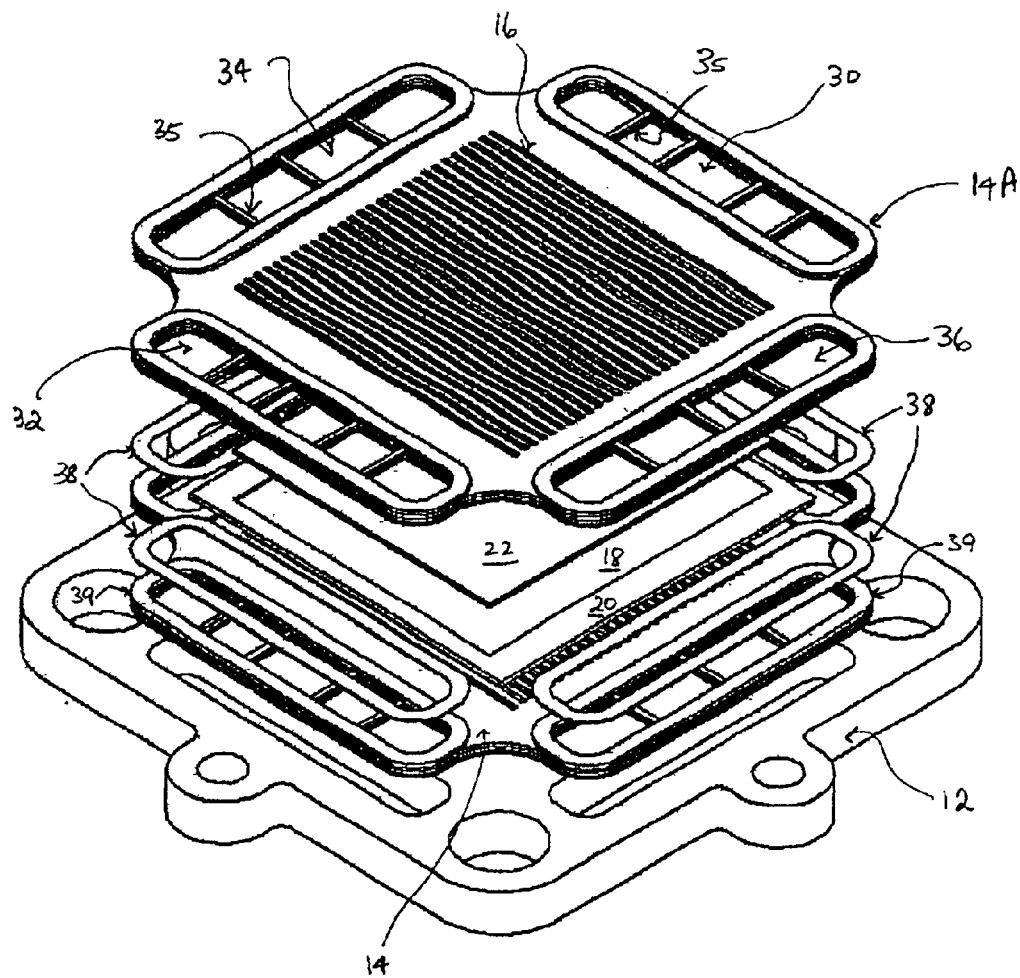
FIG. 1 shows an exploded view of an embodiment of a solid oxide fuel cell of the present invention.

As shown in FIG. 1, a fuel cell stack (10) is comprised of several components. As used herein, a "membrane unit" consists of a ceramic membrane having an electrolyte layer and opposing anode and cathode layers. A "fuel cell unit" consists of a membrane unit, an interconnect plate and the associated seals and other elements. A fuel cell stack is comprised of a plurality of repeated fuel cell units.

The base plate (12) serves as a fixture for the stack, and provides structural support for the units that comprise the stack. The bottom interconnect plate (14) has cut into one of its surface a plurality of gas flow fields (16) that serve as conduits for moving either fuel gas or oxidant gases such that they may contact the adjacent ceramic membrane unit (18) membrane. A fuel cell membrane unit (18) operates such that one side of the cell membrane unit (18) is in contact with the fuel gas, and the other side of the cell membrane unit (18) is in contact with oxidant gasses. The membrane unit cell (18) is surrounded by seal (20) that provides a sealing means such that the gases flowing across the anode or cathode of a fuel cell do not escape those flow fields into other regions of the cell or into the atmosphere.

It is important to hold ceramic membrane unit (18) firmly in place, since the electrolyte layer is comprised of a brittle cermet and is sensitive to shock and vibration.

In one embodiment, the membrane unit (18) is held in place through the presence of a porous, electrically conductive, compressible element. In one embodiment, this is nickel foam (22). Foam (22) is compressed against the next interconnect plate (14A) in sequence when the stack is assembled. Thus the ceramic electrolyte membrane unit (18) is restrained from movement in all three axes.

Vertical manifolds are formed in the stack (10) by a plurality of openings in the interconnect plates (14) which are stacked and sealed together. In the context of a single interconnect plate (14), a "manifold" refers to the opening defined by the plate which forms the stack manifold when a plurality of plates are stacked together. Fuel gases enter the stack through fuel intake manifold (30), flow across the interconnect (14) in a fuel flow field (17), through the incompressible element (22), through gas flow fields (16), and exit the stack through the fuel exhaust manifold (32). The oxidant gasses enter the stack through an oxidant intake manifold (34) and flow across the interconnect (14) through gas flow fields perpendicular to gas flow fields (16) and exit the stack through manifolds (36). All the manifolds are sealed to the interconnect plates (14) through manifold seals (38). Seals (38) are preferably compressible and yet remain flexible at the fuel cell's typical operating temperature of over 650° C. It is important that the seals remain flexible at the cells operating temperature to accommodate the thermal expansion and contraction that the different elements of the fuel cell stack will encounter during thermal cycling occurring in normal operation. Suitable preferred seals are disclosed in co-pending U.S. application Ser. No. 09/931,415 filed Aug. 17, 2001, the contents of which are hereby incorporated by reference. However, the type of seals used are not intended to be a limiting element in the within application.

Seals (38) surround the manifolds in the stack to ensure the gas integrity of the stack, such that the fuel and oxidant gas streams remain separate. Manifolds rings (39) are brazed to the interconnect plate (14) and serve as risers to allow seals for both the manifolds and the ceramic cell element (18) to be the approximately the same thickness. Other methods of sealing can be used such as providing floating manifold rings with a seal on both sides of the ring. Reinforcing ribs (35) provide hot strength to the interconnect, and to prevent the outer edges of the manifold passages from bowing outward when gas pressure is present in the manifold. Previous embodiments without ribs have experienced seal failures when the manifold passages have bulged during hot manifolds.

Figure 2:
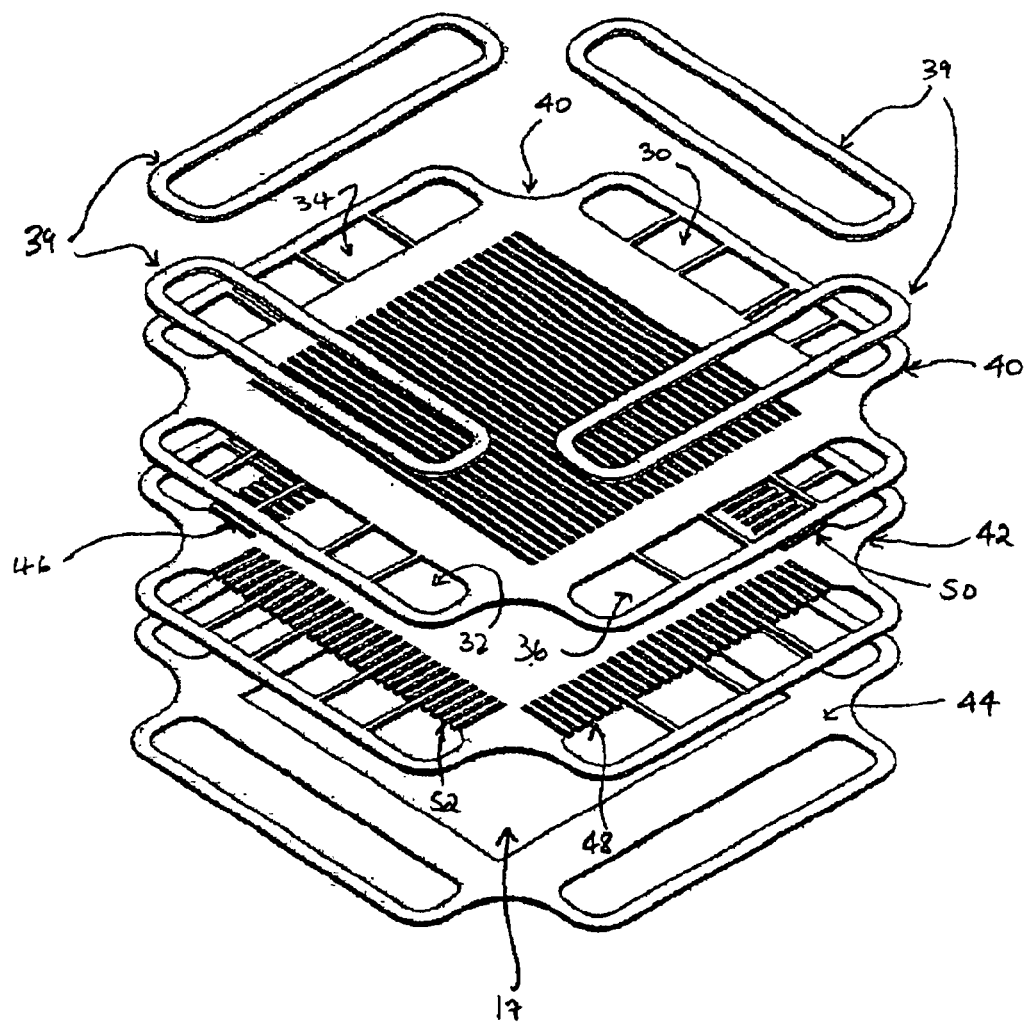
FIG. 2 shows an exploded view of the interconnect plate.
Figure 4:
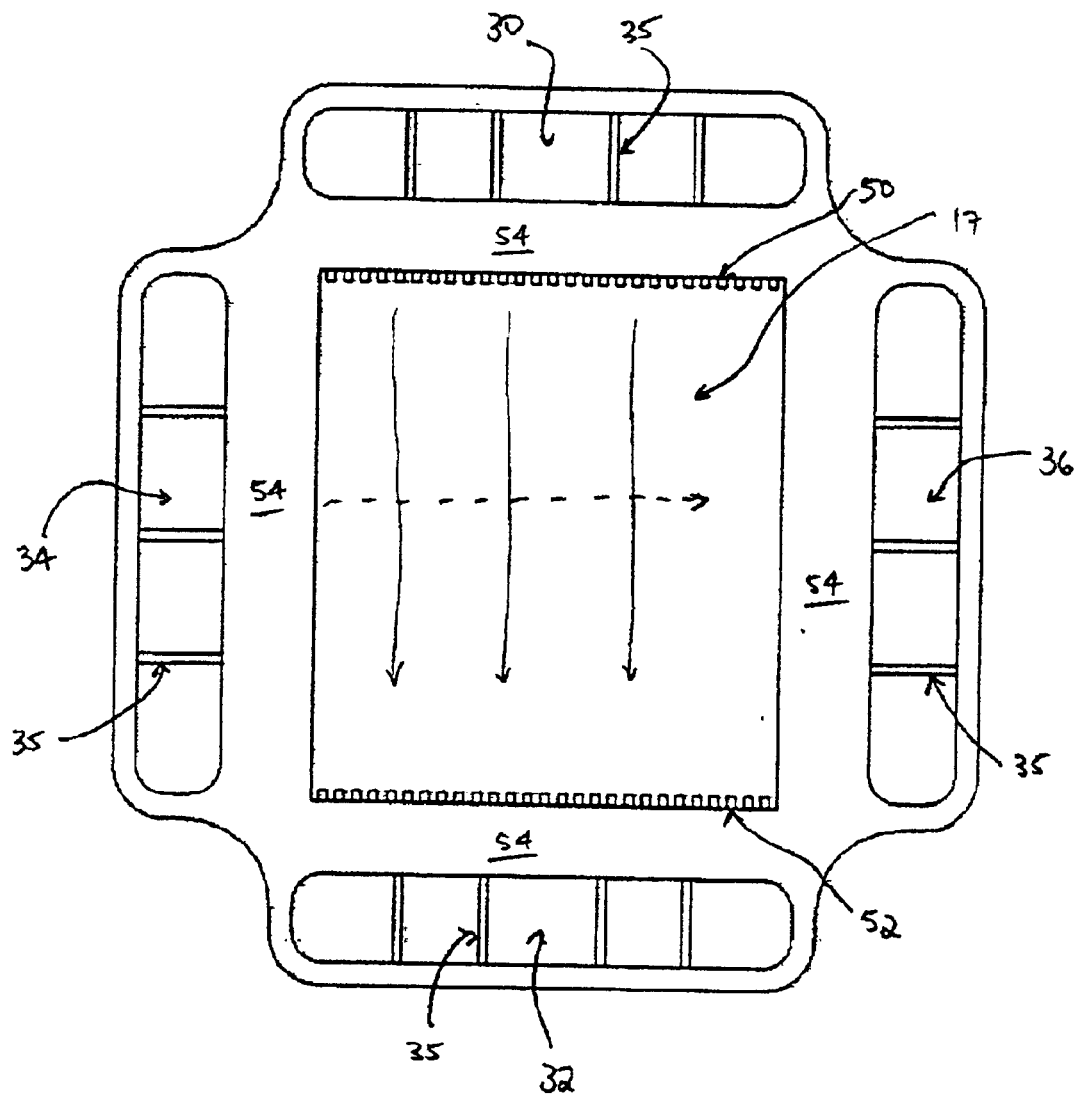
FIG. 4 shows the fuel side plate of the interconnect opposite that shown in FIG. 2, which carries the fuel.

FIG. 2 shows an exploded view of the interconnect plate (24), which is formed from three separate plates consolidated together. The top plate shown in FIG. 4 is the oxidant gas plate (40). The middle plate is the barrier plate (42) while the bottom plate is the fuel plate (44). The oxidant gas flow channels (16) are formed in the oxidant gas plate (40) and overlap with the oxidant intake manifold openings (46) formed in the barrier plate (42), which are continuous with the intake manifold (36). The channels (16) also overlap at the other end with oxidant exhaust manifold openings (48) formed in the barrier plate (42), which are continuous with the exhaust manifold (34). The channels (16) do not overlap the fuel manifold openings (50, 52). As a result, the oxidant gas channels (16) are isolated from the fuel manifolds (30, 32). The fuel plate (44) defines a single open fuel flow field (17), rather than the plurality of linear channels (16) of the oxidant plate (40). The fuel flow field overlaps with the fuel manifold openings (50, 52) but do not overlap with the oxidant manifold openings (46, 48). Thus the fuel flow field is open to the fuel manifolds (30, 32) but not the oxidant manifolds (34, 36).

Each manifold opening (46, 48, 50, 52) comprises a plurality of slots which are separated by a plurality of finger-like tabs. This arrangement, while not required, is preferred to distribute the gas, whether fuel or oxidant, more evenly across the face of each membrane unit (18). Each individual slot in the oxidant manifold openings (46, 48) is aligned with a linear flow channel (16) for the same purpose. In an alternative embodiment, the oxidant side of the interconnect plate (14) as shown in the Figures can be constructed in a similar manner as described for the fuel side as described below and shown in FIG. 4. In this alternative embodiment, the multiple flow channels (16) are replaced by a single flow field and a separate electrically conductive porous element, similar to compressible element (22). This element may take the form of stainless steel (or other suitable material) foam or another suitable item such as a corrugated expanded metal mesh.

Figure 3:
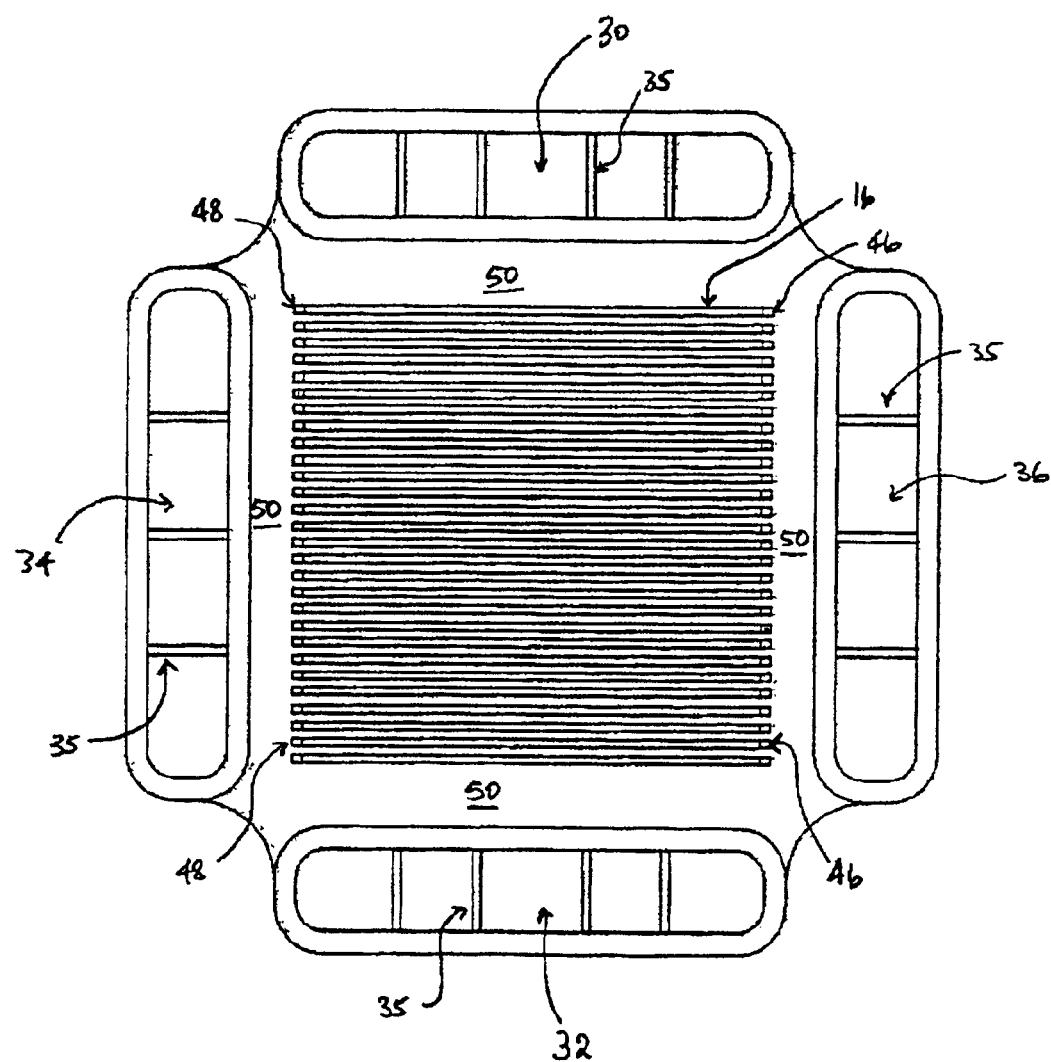
FIG. 3 shows the oxidant side of the interconnect.

FIG. 3 shows the oxidant side of the interconnect plate (14), once assembled. The oxidant flows into the cell through manifold (36) and flows through the openings (46) which overlap with the flow channels (16) as shown. The opposite end of the flow channels (16) overlap with openings (48) which leads to the oxidant exhaust manifold (34). As a result, the oxidant plate has a continuous sealing surface (50) which encircles the flow channels (16). A continuous sealing surface would not be possible if there was a direct opening from the manifolds (34, 36) to the flow channels in the oxidant plate (40). Sealing surface (50) is adapted to be usable with either flexible, compressible ceramic seals, or other types of seals, such as conventional glass seals. As the oxidant gas flows across the gas flow fields (16), it contacts the cathode electrode of the adjacent membrane unit. The oxygen ions are chemically released and travel through the membrane unit (18) where they react with the electrons released from the fuel and generate a voltage that can be used. The partially reacted oxidant is exhausted through openings (48) and into manifold (34) where it is conducted out of the fuel cell stack for further processing or vented to the atmosphere. Ribs (35) which reinforce the manifold (16) are preferred but not required.

FIG. 4 shows the fuel side of the interconnect plate (24). The fuel is conducted into the cell through the manifold (30) and flows through openings (50, 52). The fuel is conducted upward through the openings (50) and into the fuel flow field (17), where it encounters compressible element (22), which is 1).placed in the fuel flow field (17). The compressible element (22) which fits within the fuel flow field (17) is porous and the fuel gas is allowed to diffuse through the element toward openings (52). The anode side of the adjacent membrane unit (18) is in contact with the compressible element (22), and thus in contact with the fuel gas. The fuel gas at the anode reacts with the oxygen ions that have traveled through the electrolyte and reacts to produce water, carbon dioxide, and electrons. The electrons are collected by the interconnect plate(24) and routed through an external circuit (not shown) where the electron flow, otherwise called current, can do useful work, and then the electrons flow back to the cathode.(14). As with the oxidant side, a continuous sealing surface (54) is provided which surrounds the fuel flow field (17). The direction of the fuel flow through the interconnect (24) shown by the arrows is perpendicular to that of the oxidant gas flow direction on the other side of the barrier plate (42) shown as a dotted line arrow, mainly for ease of manifolding. Once the fuel gas has flowed across the interconnect plate (14) it exits through openings (52), and is directed into the fuel exhaust manifold (32) and is conducted out of the stack for further processing, or is vented to the atmosphere.

Figure 5:
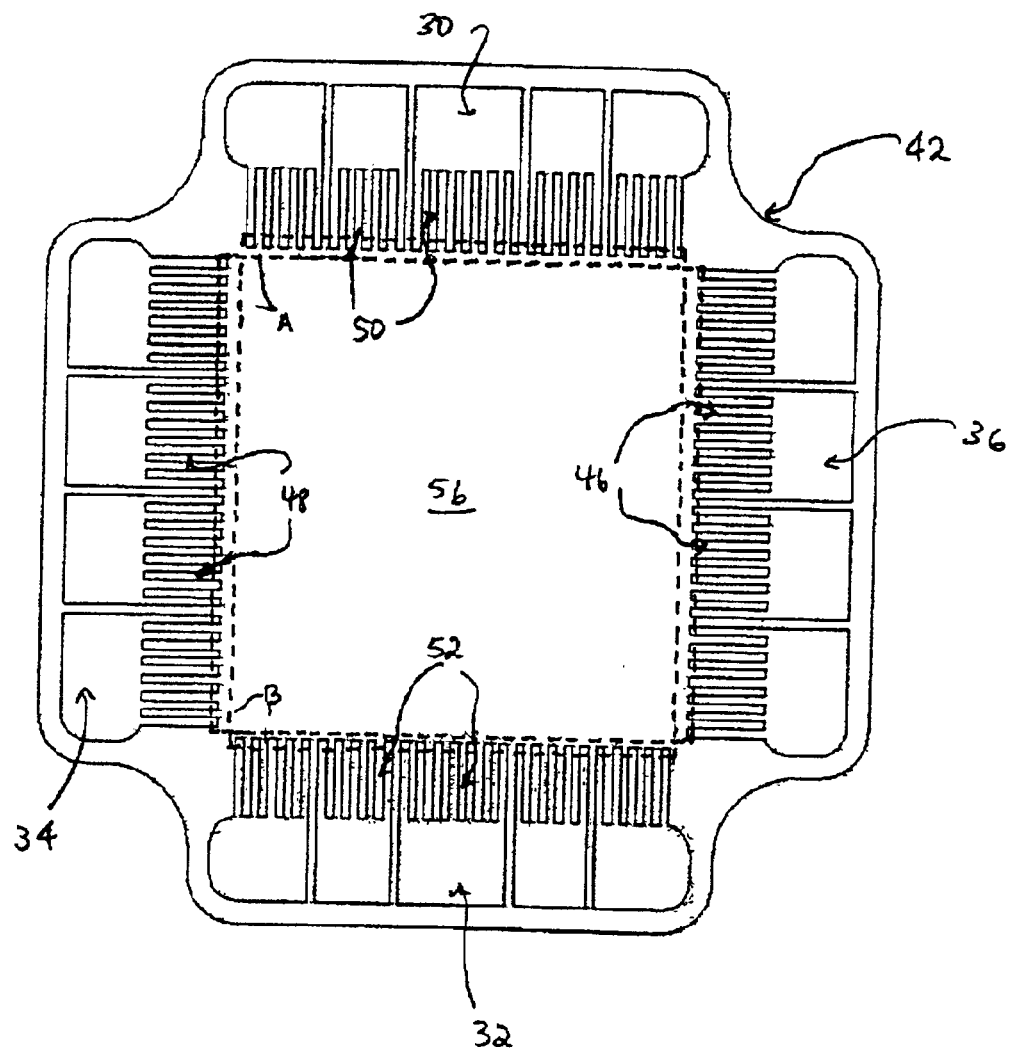
FIG. 5 shows the barrier plate, or middle plate in the interconnect assembly.

FIG. 5 illustrates the central barrier plate (42). The openings (46, 48, 50, 52) from each manifold which overlap with the fuel or oxidant flow fields are shown. The dashed line A shows the overlapping oxidant flow field (16) while the dashed line B shows the overlapping fuel flow field (17) on the other side of the barrier plate (42). The central solid portion (56) separates and confines the two flow fields (16, 17) in concert with the fuel plate (44) and oxidant plate (40) described herein.

In a further alternative embodiment, the portions of the fuel plate (44) and barrier plate (42) which are exposed to the fuel may be nickel plated in order to provide a corrosion resistant surface, and extend the life of the interconnect plate. The nickel is plated in a layer about 5 to about 10 $\mu m$ thick, and only on the anode side of the interconnect (14). Other coatings may be suitable if they are corrosion resistant, chemically compatible with the fuel cell and are electrically conductive.

In one embodiment, the slots, holes and openings that form the manifolds, flow channels (16), and flow fields (17) in each component plate of the interconnect are cut by a suitable process to ensure dimensional accuracy and interchangability. The fuel, oxidant and barrier plates described herein may be manufactured by laser cutting the required profiles and shapes into stainless steel sheets. Other suitable processes may include stamping, forming, powder injection moulding, or water jet cutting. The suitable process should be able to mass produce plates that have good dimensional tolerances, and are economical to manufacture.

In one embodiment, the plates are made from stainless steel, since it is a commonly available alloy, and resistant to reacting with the gases that flow through the stack. At the elevated temperatures found in a solid oxide fuel stack the list of suitable materials for interconnect plates is very limited since the material must resist both oxidizing and reducing environments. Stainless steel meets the requirements of the environments demand, yet is easily available and readily worked.

As is apparent, forming the interconnect plate of the present invention by machining a single piece of material is a difficult task. Therefore, in this invention, the interconnect plate (14) is formed from the three separate plates by joining the plates together through a suitable process that can endure the conditions found within a fuel cell. In one embodiment this process is brazing, although other suitable processes such as resistance or laser welding could be used. After cutting, the plates are coated with an organic binder and then the brazing powder is applied. The binder has an ethanol carrier solvent so that it will readily evaporate and will not contaminate the joint upon heating. Upon evaporation of the carrier solvent, the binder is a sticky glue like substance that is used to attach the brazing powder to the plates in preparation for assembly and heating. The composition of the brazing powder may be chosen by one skilled in the art with minimal experimentation. In one embodiment, the brazing powder is a mixture of nickel, chromium, and boron, or iron, chromium, and boron, and has a melting point lower than that of the parent metal. After the brazing powder is coated on the plates that comprise the interconnect plate they are spot welded together in a jig to ensure that the plates are correctly indexed and will remain in the proper position during the firing and brazing process. After being tacked together by spot welding, the plates are stacked in a furnace and weighted down to ensure that they will remain flat and planar during firing.

The brazing process may take place in a neutral, reducing, or vacuum atmosphere, and at a temperature of about 2000°

F. (1093° C.). The boron in the brazing powder acts as a flux to react both with the parent metal and any oxides that may be present. The nickel or iron and chromium in the brazing powder also react with the alloys in the parent metal and form a chemical as well as a mechanical bond between the powder and the plates to be joined. As there is a chemical reaction between the powder and the parent metal, this forms a very strong and hermetically sealed bond, such that the melting point of the joint after brazing is higher than the melting point of the powder before use in the joint.

While laser or resistance welding may be used to consolidate the three plates, an advantage of the powdered brazing material is that that amount of powder applied to the joint is very controlled and there is not a danger of excess brazing material filling the fine gas passage flow fields, such as might be encountered with traditional brazing. This process produces an interconnect plate that is hermetically sealed and leak free, an accomplishment that has not been achieved in the prior art.

As will be apparent to those skilled in the art, various modifications, adaptations, and variations of the foregoing specific disclosure can be made without departing from the scope of the invention claimed herein.

What is claimed is:

1. An interconnect plate comprising a fuel intake manifold, a fuel exhaust manifold, an oxidant intake manifold, and an oxidant exhaust manifold, said interconnect plate comprising a lamination of three layers, wherein:
   (a) a first layer comprises a fuel plate defining a fuel flow field;
   (b) a second layer comprises an oxidant gas plate defining a oxidant gas field; and
   (c) a third layer comprises an barrier plate disposed between the fuel plate and the oxidant gas plate, said barrier plate comprising a central barrier portion separating the fuel flow field and the oxidant gas field and defining
      i. a fuel intake opening providing fluid communication between the fuel intake manifold and the fuel flow field,
      ii. a fuel exhaust opening providing fluid communication between the fuel flow field and the fuel exhaust manifold,
      iii. an oxidant gas intake opening providing fluid communication between the oxidant intake manifold and the oxidant gas field,
      iv. an oxidant gas exhaust opening providing fluid communication between the oxidant gas field and the oxidant exhaust manifold;
   (d) and wherein the fuel flow field, oxidant gas field and central barrier portion are centrally positioned in the interconnect and the fuel intake manifold, fuel exhaust manifold, oxidant intake manifold and oxidant exhaust manifold are peripherally positioned in the interconnect.

2. The interconnect plate of claim 1 where the oxidant gas plate defines a plurality of elongated linear oxidant flow fields.

3. The interconnect plate of claim 1 where the plates are comprised of a metal.

4. The interconnect plate of claim 3 wherein the metal is a stainless steel.

5. The interconnect plate of claim 1 wherein the fuel side plate, oxidant gas side plate and barrier plate are brazed together.

6. The interconnect plate of claim 1 where the fuel side plate, oxidant gas side plate and barrier plate are welded together.

7. The interconnect plate of claim 1 where the fuel side plate and a portion of the barrier plate exposed to the fuel flow field of the interconnect plate are nickel plated.

8. The interconnect plate of claim 7, where the plating is about 5 to about 10 $\mu$m thick.

9. The interconnect plate of claim 1 wherein interconnect plate is substantially square or rectangular in shape and wherein the fuel intake and exhaust manifolds are arrayed on opposing sides of the square or rectangle and wherein the oxidant gas intake and exhaust manifolds are arrayed on opposing sides of the square or rectangle.

10. A solid oxide fuel cell stack comprising at least two interconnect plates as claimed in claim 1, a solid oxide fuel cell unit, a manifold seal continuously encircling each manifold, and a cell seal continuously encircling the fuel cell unit, wherein the fuel cell unit, manifold seals and cell seal are disposed between the two interconnect plates.

* * * * *